April 18, 1967 M. G. KAUFMAN 3,315,161
PHASE LOCKED LOOP
Filed Jan. 27, 1965
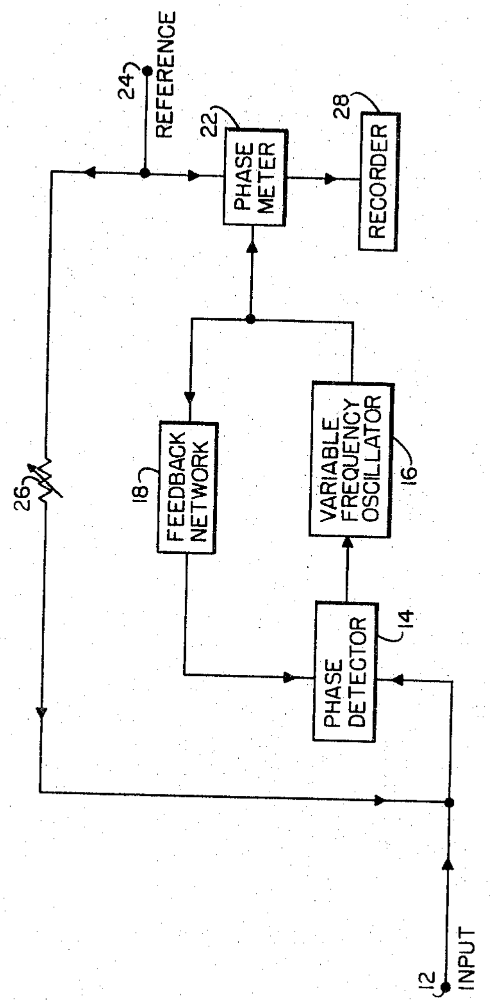
INVENTOR
MAXIME G. KAUFMAN
BY James G. Murray
R. S. Sciascia ATTORNEYS United States Patent Office 3,315,161
Patented Apr. 18, 1967

3,315,161
PHASE LOCKED LOOP

Maxime G. Kaufman, Camp Springs, Md., assignor to the United States of America as represented by the Secretary of the Navy

Filed Jan. 27, 1965, Ser. No. 428,591
3 Claims. (Cl. 324—83)

The invention described herein may be manufactured and used by or for the Government of the United States of America for governmental purposes without the payment of any royalties thereon or therefor.

The present invention relates to a phase locked loop system and more particularly to an electronic system which produces an output signal which is in phase with, but does not contain the noise components which are included in the input signal.

Recent technological advances have resulted in an ever increasing number of man-made satellites being placed in orbit around the earth. For obvious reasons it became desirable to provide systems which would detect and monitor the orbiting satellites which pass over the continental United States. One of these systems is the Naval Space Surveillance System which is described in U.S. Patent No. 3,122,741 issued to Roger L. Easton on February 25, 1964 and in an article by Philip J. Klass titled "Spasur Net Giving Vital Norad Coverage" which appeared in the November 26, 1962 issue of Aviation Week and Space Technology.

In the Naval Space Surveillance System, information concerning the satellite is obtained by very precisely analyzing the phase of many signals. It is self-evident that the system accuracy is intimately related to the capability of the necessary electronic processing circuits to maintain unchanged the phase of these signals. As might be expected, this requirement proved especially burdensome in the filtering circuits which function to separate the signal from the broad band noise, particularly since the received signal varies to some extent in frequency due to the Doppler effect.

The general purpose of this invention is to provide, to a degree of accuracy and with a simplicity of circuitry not attainable with prior art devices, an electrical circuit which will furnish an output signal which is in phase relation with, but does not include the noise components of an input signal. To attain this result, the present invention contemplates a unique phase locked loop which includes a variable frequency, voltage controlled, oscillator.

An object of the invention, therefore, is the provision of a unique phase locked loop.

Another object of the invention is to provide an electrical circuit which will furnish an output signal which is in phase relation, but does not include the noise components of an input signal.

Yet another object of the present invention is to provide a unique electrical circuit which includes a phase locked loop containing a variable frequency, voltage controlled, oscillator and which will furnish an output signal which is in phase relation with, but does not include the noise components of an input signal.

The exact nature of this invention as well as other objects and advantages thereof will be readily apparent from consideration of the following specification relating to the annexed drawing in which the figure illustrates an embodiment of the invention in block diagram form.

Referring now to the drawing, the circuit of the invention receives an input signal, which may include undesired noise components, at terminal 12. This signal is applied to one input of phase detector 14, the other input of which is connected to receive the output of variable frequency oscillator 16, which is in turn connected to be controlled by the output voltage of phase detector 14. It may be desirable, in some circumstances, to include feedback network 18 in the feedback path, either for purposes of attenuation and/or phase shifting.

The output of oscillator 16 is also connected to one input of phase meter 22, the other input of which is connected to receive a reference signal which is applied to terminal 24. This terminal is also connected, through variable resistor 26, to the phase detector. A recorder 28 is connected to be controlled by the output of phase meter 22.

Except for the additional feature of visually indicating the phase difference measured, the phase meter 22 may be similar to the phase detector 14 and both may be any one of the well known devices which produce an electrical output signal which is proportional in magnitude and polarity to the phase difference between two input signals. Likewise, the variable frequency oscillator 16 may be any one of the many well known oscillators, the frequency of which is controlled by an applied potential.

Although the operation of the invention will be described in combination with the Navy Space Surveillance System, it will be evident that the invention can be used in combination with many other systems which require a phase locked loop.

The reference signal at terminal 24 is typically a 1 kc. signal received from the master clock which synchronizes the operation of the receiver system. After much attenuation by resistor 26, this signal is applied to phase detector 14 and, in the absence of a signal at terminal 12, serves the purpose of keeping the loop, consisting of detector 14, oscillator 16 and feedback network 18, operating precisely at a frequency of 1 kc. and in phase relation with the reference signal. This signal, in other words, prevents the oscillator 16 from drifting in the absence of a signal at terminal 12. The output of meter 22 is therefore either nulled, or a fixed value, in the absence of a signal at input terminal 12.

A 1 kc. signal, with undesired noise components, appears at terminal 12 whenever the system detects the presence of a satellite. The phase of this signal will be indicative of the location of the satellite. Because the amplitude of the signal at terminal 12 is much larger than the attenuated reference signal received from resistor 26, the detector 14 responds to the larger, terminal 12, signal and controls the variable frequency oscillator 16 to assume the desired phase relation, determined by network 18, to the signal at terminal 12. The output of variable frequency oscillator 16 is, however, much more pure, i.e. free from noise, and free from incidental phase shifts, usually acquired when a signal is filtered by passive components, than is the signal at terminal 12. As a result, the indication of the satellite location produced by meter 22 and recorded by recorder 28 is much more accurate than if the signal at terminal 12 is directly applied to phase meter 22.

It can be seen that the invention described provides a unique electrical circuit which includes a phase locked loop containing a variable frequency, voltage controlled, oscillator and which furnishes an output signal which is in phase relation with, but does not include the noise components of, an input signal.

Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. Apparatus for measuring and recording the phase of an intermittent input signal of predetermined frequency comprising:

a phase detector having first and second input connections and producing an output signal which is proportional to the phase difference between signals applied to said first and second connections;

a variable frequency oscillator coupled to receive and be controlled by said phase detector output signal;

feedback coupling means for coupling said variable frequency oscillator output signal to said phase detector first input connection;

terminal means connected to said phase detector second input connection for applying said intermittent input signal;

reference frequency signal coupling means for applying a reference frequency signal to said phase detector second input connection and measuring and recording means connected to receive said reference frequency and oscillator output signals for indicating the phase of said input signal.

2. Phase measuring apparatus as set forth in claim 1 wherein said feedback coupling means includes a phase shifting and attenuation network.

3. Phase measuring apparatus as set forth in claim 2 wherein said reference frequency signal coupling means includes a variable resistor.

References Cited by the Examiner

UNITED STATES PATENTS

| | | | |
|---|---|---|---|
| 3,059,187 | 10/1962 | Jaffe. | |
| 3,087,121 | 4/1963 | Bell | 328—134 X |
| 3,195,059 | 7/1965 | Adams | 325—419 X |
| 3,199,037 | 8/1965 | Graves. | |
| 3,201,702 | 8/1965 | Hanulec et al. | |
| 3,238,450 | 3/1966 | Palmer | 324—83 |

WALTER L. CARLSON, *Primary Examiner.*

P. F. WILLE, *Assistant Examiner.*